United States Patent Office — 3,230,805
Patented Jan. 25, 1966

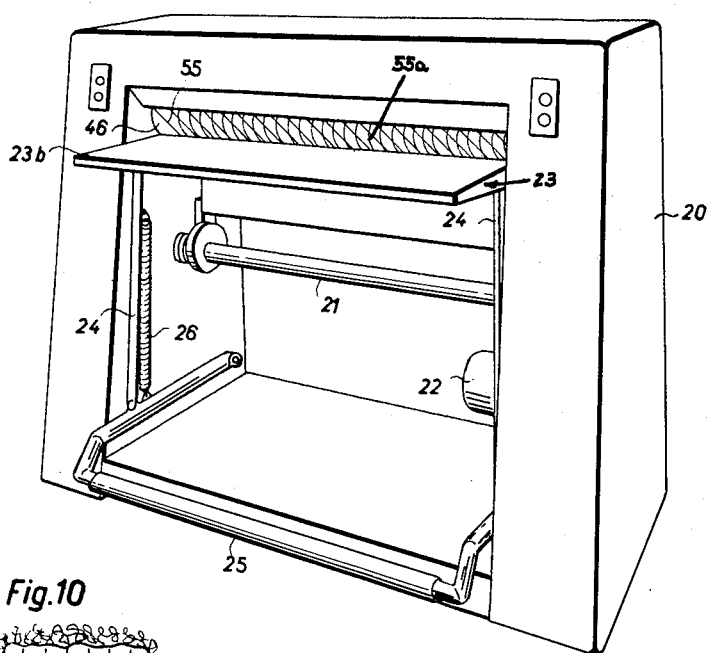

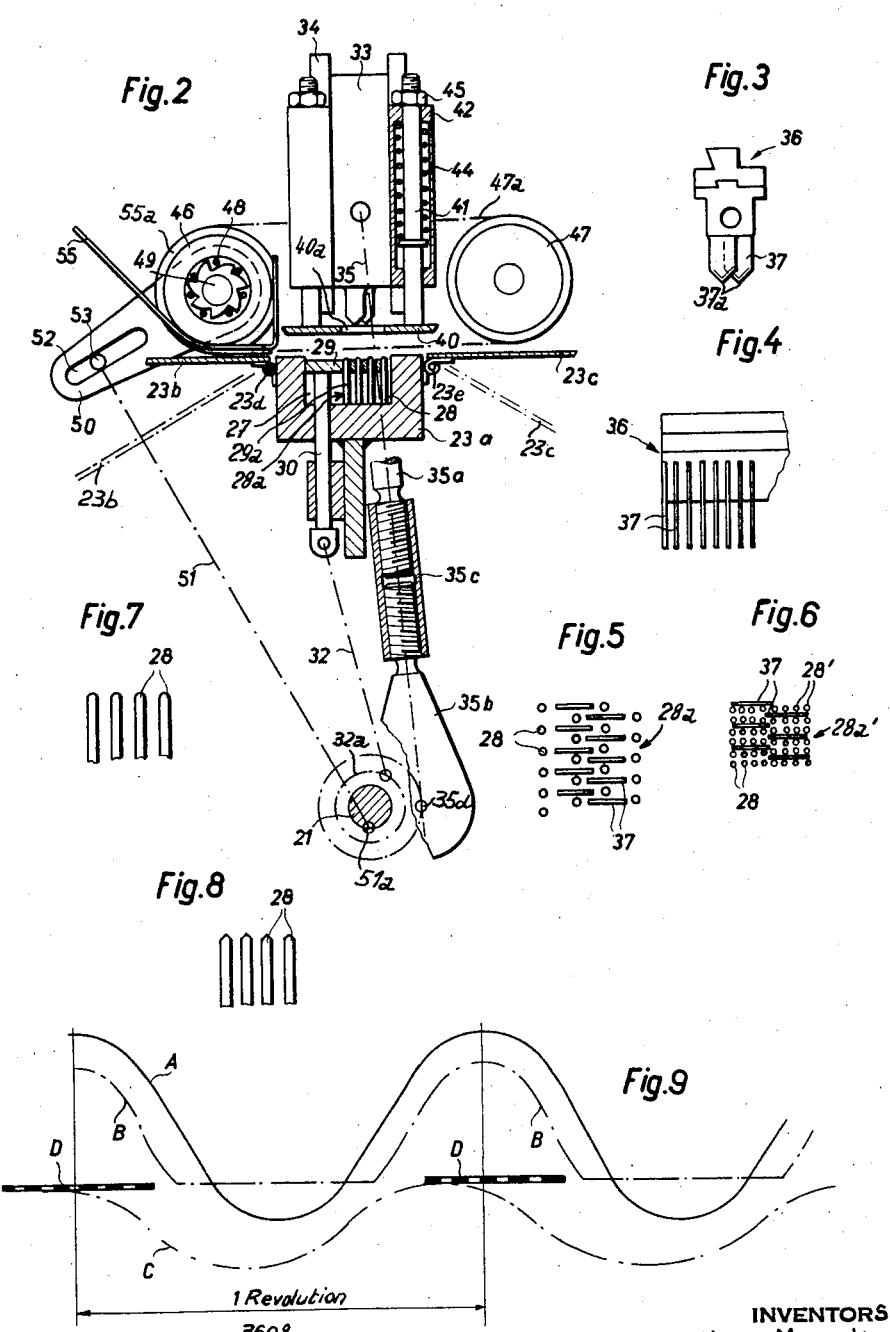

3,230,805
MACHINE FOR PRODUCING UNIFORM INCISIONS OR CUTS IN FUR SKINS OR PELTS
Hans Messerli, Ibach, Schwyz, and Xaver Wyss, Ennetburgen (NW), Switzerland, assignors to Etablissement Patewag, Vaduz, Liechtenstein, a corporation of Liechtenstein
Filed May 25, 1964, Ser. No. 369,860
Claims priority, application Switzerland, May 28, 1963, 6,690/63
10 Claims. (Cl. 83—133)

The present invention has reference to an improved machine for producing uniform cuts or incisions in fur skins or pelts by means of an assembly of cutters periodically movable to-and-fro, such cutter assembly incorporating at least one row of knives or blades spacedly arranged adjacent one another and which pierce the fur skin or pelt from the hairless side. Such machine further comprises a pin field embodying pin members supporting the fur skin at the hairy or fur side and between which engage the aforesaid blades, a support table for the fur skins which exhibits a recess or compartment containing the pin field and which is at least approximately flush with the free end of the pin members, as well as hold- or press-down means movable in the same direction as the cutter assembly for pressing the fur skins against the support table.

A machine of the aforementioned type is known to the art. It serves for applying uniformly distributed, non-continuous cuts or incisions in the skin of fur pelts in order thereafter to be able to stretch such fur pelts in the transverse direction of the incisions and to make the same more pliable as well as penetratable by air. Fur pelts processed in this manner are particularly suitable for lining shoes, coats and other wearing apparel.

The previously known machine was not suitable for performing a rational and continuous mode of operation because the fur pelts to be handled, in each instance, had to be spanned in a type of frame.

It is, therefore, an important object of the present invention to overcome the disadvantages of the prior art machine as well as to provide a number of improvements regarding the same.

A further important object of the present invention resides in the provision of an improved machine for applying uniform cuts or incisions in materials, in particular fur skins or pelts, which is highly reliable in operation, relatively simple in construction, capable of operating substantially continuously, and does not require any considerable skill on the part of the operator of such machine.

The machine designed according to the invention is manifested by the features that, the hold- or press-down means is without its own drive and is only subjected to the action of spring elements pressing the press-down means against or towards the pin field, that stop means limit the movement of the press-down means with respect to the cutter assembly brought about by the spring elements, so that the cutter assembly during a portion of its return movement entrains the press-down means against the action of the spring elements or means, that in the recess of the support table there is arranged a stripper through which penetrate the pins of the pin field and which is displaceable in the lengthwise direction of the aforesaid pins. Additionally, the cutter assembly and the stripper are drivable through the agency of a common drive shaft with the same frequency, the cutter assembly and the press-down means being arranged between two rollers or drums serving to feed or advance the fur skins and located above components or portions of the support table yieldably pressed in the direction of the aforesaid rollers, and that the rollers are conjointly driven stepwise in the same direction in each case when the cutter assembly and press-down means are retracted.

Other features, objects and advantages of the invention will become apparent by reference to the following detailed description and drawings in which:

FIGURE 1 is a perspective view of a machine designed according to the invention for producing uniform or regular cuts or incisions in fur pelts or skins;

FIGURE 2 schematically illustrates a vertical cross-sectional view through the essential components of the machine depicted in FIGURE 1;

FIGURE 3 illustrates in side view details of the cutter assembly;

FIGURE 4 is a fragmentary front view of a portion of the cutter assembly;

FIGURE 5 is a plan view in horizontal cross-secton of a portion of the cutter assembly and the pin field;

FIGURE 6 is a view similar to FIGURE 5 of a modified arrangement;

FIGURE 7 depicts in side view a portion of the pin field;

FIGURE 8 is a view similar to FIGURE 7, yet illustrates a modified form of pin field;

FIGURE 9 graphically depicts the course of movement as a function of time of a number of different components of the inventive machine;

FIGURE 10 illustrates a fur pelt as viewed from the furless or skin side and which has been processed by the inventive machine;

FIGURE 11 is a fragmentary cross-sectional view of the fur pelt of FIGURE 10 taken along lines XI—XI thereof; and FIGURE 12 is a view similar to FIGURE 10 of the perforated or punctured fur pelt in stretched or taut condition.

Describing now the drawings, the inventive machine depicted in FIGURE 1 comprises a frame or housing 20 in which there is rotatably mounted a horizontal drive shaft 21. The drive shaft 21 is driven via an electric motor 22 through the agency of a suitable speed reduction drive not visible in the drawings. A support or work table 23 for the fur pelts or skins to be processed is located above the drive shaft 21. This support table 23 incorporates a central or middle portion 23a arranged non-displaceably at the frame 20 and two outer portions 23b and 23c which are articulated or pivotably mounted at 23d and 23e respectively, to the aforesaid frame 20, as best ascertained by reference to FIGURE 2.

The table component or portion 23b of the support table 23 arranged at the front side of the machine is operably coupled via two guide rods 24 with a foot-operated pedal or treadle 25 located at the lower region of the frame 20. Two springs 26 engage with the aforesaid foot-operated pedal 25 and associated guide rod 24, of which only one such spring is visible in FIGURE 1. The springs 26 act to pivot in upward direction the foot-operated pedal or stirrup 25 and thereby also the table component 23b until the latter assumes a substantially horizontal position. However, when stepping upon the foot-operated pedal 25 it is possible to downwardly pivot the table component 23b, as such is indicated in phantom lines in FIGURE 2.

The table component or portion 23c at the rearward side of the machine, as previously mentioned, is likewise pivotably mounted and capable of assuming the positions shown in FIGURE 2 in full and phantom lines respectively. Actuation of the table portion or component 23c can occur either manually or automatically by means of a photoelectric control in dependence upon the passage of the fur pelt material to be processed.

The stationary central component or portion 23a of the support table 23 is provided at the top with a recess 27 in which there is arranged a pin field 28a incorporating vertically extending pin members 28, the free ends of which are at least approximately flush with the upper side or face of the support table 23, as best shown in FIGURE 2. For example, four rows of pins 28 are provided, such rows extending throughout the entire working width of the support table 23. The pin field 28a serves to support or prop the fur pelt to be worked at the side thereof covered with hair or fur. The pins 28 of the pin field 28a possess, by way of example, a diameter of 0.4 to 4 millimeters. The upper end of the respective pins 28 can be rounded-off hemispherically or spherical sector-shaped, as illustrated in FIGURE 7, or can also exhibit conical or tapered tips possessing a cone angle of 30° to 180°, as best illustrated in FIGURE 8.

A stripper means 29 in the form of a horizontal plate is additionally located in the recess or compartment 27 and is provided with holes or bores 29a for piercingly receiving each pin member 28 of the pin field 28a. The stripper 29 is connected to vertical guide rods 30 extending through the central portion 23a of the support table 23 and are movably supported upwardly and downwardly thereat. Each of the guide rods 30 is operably connected with an eccentric generally indicated at 32a, actuated by the drive shaft 21 and through the agency of a connecting rod 32, only schematically depicted in FIGURE 2.

A beam 33 is located above the central portion 23a of the support table 23 and extends parallel to the drive shaft 21. This beam 33 is displaceably mounted for upward and downward movement at its ends in vertical guides 34 of the machine frame 20. Furthermore, each end of the beam member 33 is connected with a connecting rod 35 driven from the drive shaft 21 by means of an eccentric, generally represented by reference numeral 35d. The beam member 33 and the stripper 29 are thus displaceable upwards and downwards with the same frequency. Each connecting rod 35 exhibits two end portions or components 35a and 35b possessing opposite thread pitch and connected with one another by means of a rotatable connecting or mother sleeve 35c. Due to turning of the connecting sleeve 35c it is possible to change the length of the connecting rod 35 within specific limits.

A cutter assembly 36 incorporating a plurality of cutter blades or knives 37 is secured to the underface of the beam member 33, such knives 37 each including cutting edges converging to a point 37a and being arranged in two rows offset or displaced with respect to one another in such a manner that the knives or blades of one row are situated opposite the intermediate spaces between the blades or knives of the other row, as clearly ascertainable by an inspection of FIGURES 3 and 5. Additionally, FIGURE 5 illustrates the mutual arrangement of the knives 37 and the pins 28 of the pin field 28a. During upward and downward movement of the beam member 33 the tips 37a of the knives 37 enter between the pins 28 of the pin field 28a without touching such pins. A variant embodiment of the construction of a modified form of pin field 28a' with a larger number of thinner pins 28' is depicted in FIGURE 6.

A plate-shaped hold- or press-down means 40 is located between the beam member 33 and the support table 23. This press-down means 40 is provided with slots or aperture means 40a permitting penetration of the knives or blades 37 and is displaceably guided upwardly and downwardly through the aid of vertical guide rods 41 arranged in guide sleeves or jackets 42. The guide sleeves 42 are connected to the beam member 33 and contain spring means 44 which act to downwardly displace the press-down means 40. The downward movement of the press-down means 40 with respect to the beam member 33 is, however, limited by stop nut means 45 seated at the upper end of the relevant guide sleeve 42.

The inventive machine additionally incorporates two rollers or drums 46 and 47 serving to feed or advance the fur pelt or skin to be processed, the axes of which extend parallel to the drive shaft 21. The beam member 33 and the press-down means 40 are arranged between these two drums 46 and 47. Such drums 46 and 47 are rotatably connected with one another by means of a chain for example, schematically depicted by reference numeral 47a in FIGURE 2. The one roller or drum member 46 is operatively connected with a shaft 49 by means of a ratchet coupling 48 or equivalent expedient which entrains only in one direction or sense of rotation. The shaft 49 carries a rocking or swivel lever 50 driven by means of the shaft 21 through the intermediary of a connecting rod 51 and an eccentric, merely schematically represented by reference numeral 51a. The rocking or swivel lever 50 possesses an elongated or lengthwise slot 52 in which is adjustable the articulation link or joint 53 operably connecting such rocking lever 50 with the associated connecting rod 51 for the purpose of changing the rotary step movement of the roller or drum 46.

Both of the drums 46 and 47 are located above the tiltable or rockable external table portions or components 23b and 23c, respectively, of the support table 23. By virtue of the springs which upwardly press the table components 23b and 23c it is possible to press the fur pelt material to be processed and which has been processed against the drums 46 and 47 respectively.

The roller or drum 46 arranged at the forward side of the machine is provided with a number of peripheral grooves 55a in which engage stationary guide wires 55 or the like serving the purpose of forcibly guiding the fur pelts to be processed beneath the drum 46 and then releasing the same from such drum. It should be self-evident as well as clearly understood that the connecting rods 32, 35 and 51 can also be actuated by means of cranks of the drive shaft 21 instead of eccentrics.

The manner of use and mode of operation of the heretofore described machine is as follows: With the drive motor 22 switched-in the drive shaft 21 rotates which, during each rotation, imparts an up and down movement to the stripper 29 by means of the connecting rod 32 and to the beam member 33 by means of the connecting rod 35. Furthermore, during each rotation of the drive shaft 21 the swivel arm 50 has imparted thereto a to-and-fro oscillation or rocking movement. With each downward rocking of the swivel arm 50 the roller or drum 46 is rotatably entrained by means of the coupling 48, not however during the upward movement of the aforesaid arm 50. The other roller or drum 47 is forcibly rotated together with the driven drum 46.

In FIGURE 9 the movement of the beam member 33 and the cutter assembly 36 connected with such beam member as a function of time or the rotation of the shaft 21 respectively, is illustrated by a full wave line or curve A. A chain-dot line B depicts the movement of the hold- or press-down means 40, whereas the movement of the stripper 29 is represented by a chain-dot wave line or curve C. The press-down means 40 exactly follows the movement of the beam member 33 as long as the stop nuts 45 are seated upon the guide sleeves 42. However, the downward movement of the press-down means 40 is limited by impact of the same against the support table 23 or the fur pelt to be worked.

The rotation of the drums 46 and 47 in each case begins then when the beam member 33 has moved upwardly to such an extent that the press-down means 40 has raised itself from the stationary table component 23a of the support table 23, and terminates during the downward movement of the aforesaid beam member in each case before the press-down means 40 is seated upon the support table 23. During the rotation of the drums or rollers 46 and 47 the fur pelt thus finds, on the one hand, a free through-passage between the support table 23, the pin field 28a and the stripper 29 and, on the other hand, the press-down means 40 and the cutter blades or knives 47. In FIGURE 9 the movement of the drums 46 and 47 is represented by horizontal, hatched lines D.

A fur skin or pelt to be processed is placed upon the external table portion 23b of the support table 23 with its side or face covered with hair or fur directed downwardly and is pushed beneath the drum member 46. In order to render such easier the pedal or stirrup 25 is depressed by means of the operator's foot, whereby the table component 23b of the support table 23 is downwardly tilted to the desired extent. When the leading end of the fur pelt lies beneath the drum 46 the stirrup or pedal 25 is released, whereby the aforesaid fur pelt is pressed from beneath against the drum 46 and is stepwise advanced or pushed forward by such drum. The fur pelt then travels between the raised press-down means 40 and the pin field 28a. Already during this feed movement of the pelt the stripper 29 and then the beam member 33 with the press-down means 40 begin to move downwardly. After the drums 46 and 47 come to rest the press-down means 40 presses against the fur pelt, whereby the hairs or fur of the pelt find place between the pins 28 of the pin field 28a.

Afterwards the cutter knives 37 penetrate through the openings or apertures 40a of the press-down means 40 and pierce with their tips 37a into the skin of the fur pelt, whereby there is produced in such fur pelt two rows of incisions or cuts 61 (FIGURE 10) which are staggered with respect to one another. Thereafter, the stripper 29 and the beam member 33 again move upwardly, whereby the cutter blades or knives 37 move out of the pelt, the press-down means 40 rises from the aforesaid pelt and the stripper 29 pushes the cluster of hair or fur of such fur pelt upwardly past the pin field 28a. Then, the drums 46 and 47 again perform a partial rotation in order to thereby advance through one step the fur pelt, so that a portion of the pelt which has not yet been processed comes to rest beneath the cutter assembly 36, whereafter the heretofore described operation is repeated. By correctly adjusting the position of the joint or articulation link 53 at the swivel arm 50 there can be achieved that a number of uniformly or regularly distributed cuts or incisions 61 appear, as best shown in FIGURE 10. The already worked portion of the fur pelt travels through between the drum 47 and the rear external component or portion 23c of the support table 23. The drum member 47 in particular effectuates feed movement of the fur pelt when its trailing end has already departed from the drum member 46.

Advantageously, both of the drums 46 and 47 possess the same diameter. It is possible, however, to make the diameter of the drum member 47 a little larger in order to achieve a tensioning or spanning of the fur pelt between both of the drums 46 and 47 in the region of the cutter assembly 36. The same can be obtained by providing an unequal number of teeth for the chain wheels through the agency of which both of the drums 46 and 47 are operatively connected with one another.

FIGURE 9 indicates that a small phase displacement or shifting exists between the movement of the stripper 29 and the beam member 33 and, indeed in the sense that, the movement of the stripper 29 is somewhat advanced. This provides the advantage that the cluster of hairs or fur of the pelt can already extend into the intermediate spaces of the pin field 28a during the feed movement.

By changing the length of the connecting rod 35 serving to drive the beam member 33 it is possible to regulate the penetration depth of the cutter knives 37 so that, as desired, there results longer or shorter cuts or incisions 61.

A fur pelt provided with incisions or cuts 61 in the aforedescribed manner, as such is represented in FIGURE 10, can be considerably stretched or expanded in the transverse direction of the aforesaid incisions 61, whereby such incisions widen into elongated, lancet-shaped openings 61a, as best shown in FIGURE 12. If the cluster of hairs of the pelt is thick, as such is particularly the case with lamb skin, the hair cluster completely covers the openings 61a. The stretched skin or pelt possesses a larger area or surface with approximately unchanged heat insulation capacity and is considerably more pliant. Fur skins or pelts worked in the described manner are mainly suitable for lining clothing apparel, shoes and so forth.

It should be appreciated that the illustrated and described machine has the advantage that it divides the produced rows of incisions uniformly throughout the entire pelt surface or area, works quickly and continuously and does not require any special preparation of the fur skins. Additionally, the operation of the machine is so simple that no specially skilled workers are necessary.

While there are shown and described present preferred embodiments of the invention it is to be distinctly understood that the invention is not limited thereto but may be otherwise variously embodied and practised within the scope of the following claims.

What is claimed is:

1. Machine for producing uniform incisions in fur pelts comprising a cutter assembly mounted for periodic to-and-fro movement, said cutter assembly incorporating at least one row of cutter knives spacedly arranged adjacent one another and penetratable into the fur pelt from the side devoid of fur, a pin field embodying a plurality of spaced pin members supporting the fur pelt at the side covered with fur and between which engage said cutter knives, a support table for the fur pelts, said support table being provided with recess means containing said pin field and approximately flush with the free end of said pin members, displaceable press-down means movable in the same direction as said cutter assembly for pressing the fur pelts onto said support table, spring means cooperating with said press-down means, said press-down means being devoid of its own drive and only being subjected to the action of said spring means pressing said press-down means towards said pin field, stop means for limiting the movement of said press-down means with respect to said cutter assembly brought about by said spring means, so that said cutter assembly during a portion of its return movement entrains said press-down means against the action of said spring means, stripper means arranged in said recess means of said support table through which piercingly extend said pin members of said pin field, said stripper means being displaceable in the lengthwise direction of said pin members, a common drive shaft for driving said cutter assembly and stripper means with the same frequency, a pair of spaced drum members for advancing the fur pelts, said support table incorporating table portions mounted to be yieldably pressed towards said drum members, said drum members being disposed above said table portions, means for conjointly driving said drum members in the same direction in stepwise manner when said cutter assembly and said press-down means are retracted with respect to said support table.

2. Machine as defined in claim 1 wherein the movement of said stripper means is phase advanced with respect to the movement of said cutter assembly.

3. Machine as defined in claim 1 including a beam member to which said cutter assembly is secured, guide elements for guiding said beam member for to-and-fro movement, guide means provided for said press-down means, said spring means being operatively associated with said guide means.

4. Machine as defined in claim 1 wherein said press-down means comprises a plate member arranged parallel to said support table, said plate member being provided with aperture means for permitting through-passage of said cutter knives of said cutter assembly.

5. Machine as defined in claim 1 further including a connecting rod serving to drive said cutter assembly, said connecting rod incorporating two components provided with coaxially arranged threaded portions possessing opposite thread pitch, a common connecting element for interconnecting said two components engaging with said threaded portions thereof and capable of being rotated in order to change the length of said connecting rod for the purpose of altering the penetration depth of said cutter knives.

6. Machine as defined in claim 5 wherein each of said cutter knives possess converging cutting edges providing a knife tip.

7. Machine as defined in claim 1 wherein said drum members are operably coupled with one another, a shaft member, coupling means for operatively connecting one of said drum members with said shaft member for entraining movement in only one direction of rotation, a swivel arm carried by said shaft member, a connecting rod for driving said swivel arm, said connecting rod being driven by said common drive shaft for said cutter assembly and stripper means, link means for connecting said swivel arm with said connecting rod displaceable along said swivel arm in order to change the rotational step-wise movement of said drum members.

8. Machine as defined in claim 7 wherein said swivel arm means is provided with an elongated slot for slidably receiving said link means.

9. Machine as defined in claim 1 wherein at least a table portion of said support table arranged beneath one of said drum members is lowerable from the associated drum member to facilitate insertion of the fur pelts.

10. Machine for producing uniform incisions in materials, particularly fur pelts, comprising a cutter assembly mounted for periodic to-and-fro movement, said cutter assembly incorporating at least one row of cutter knives spacedly arranged adjacent one another and penetratable into the fur pelt from the side devoid of fur, a pin field embodying a plurality of spaced pin members supporting the fur pelt at the side covered with fur and between which engage said cutter knives, a support table for the fur pelts, said support table being provided with recess means containing said pin field, displaceable press-down means movable in the same direction as said cutter assembly for pressing the fur pelts onto said support table, spring means cooperating with said press-down means, said press-down means being devoid of its own drive and only being subjected to the action of said spring means pressing said press-down means towards said pin field, stop means for limiting the movement of said press-down means with respect to said cutter assembly brought about by said spring means, so that said cutter assembly during a portion of its return movement entrains said press-down means against the action of said spring means, stripper means arranged in said recess means of said support table and including aperture means through which piercingly extend said pin memebrs of said pin field, said stripper means being displaceable in the lengthwise direction of said pin members, drive means for driving said cutter assembly and stripper means with the same frequency, a pair of spaced drum members for advancing the fur pelts, said drum members being disposed above said support table, means for conjointly driving said drum members in the same direction in step-wise manner when said cutter assembly and said press-down means are retracted with respect to said support table.

References Cited by the Examiner
UNITED STATES PATENTS

| | | | |
|---|---|---|---|
| 1,357,727 | 11/1920 | Roach | 83—175 |
| 2,038,857 | 4/1936 | Rutter et al. | 83—915 |
| 2,073,219 | 3/1937 | Moulton | 83—915 |
| 2,959,081 | 11/1960 | Vysansky | 83—915 |

ANDREW R. JUHASZ, *Primary Examiner.*